United States Patent
Niewiadomski et al.

(10) Patent No.: US 11,427,199 B2
(45) Date of Patent: Aug. 30, 2022

(54) SYSTEM FOR ALIGNING A VEHICLE HITCH LOCATION IDENTIFIER WITH A TRAILER COUPLER

(71) Applicant: Ford Global Technologies, LLC, Dearborn, MI (US)

(72) Inventors: Luke Niewiadomski, Dearborn, MI (US); Roger Trombley, Ann Arbor, MI (US); Nikhil Nagraj Rao, Cupertino, CA (US); Lihui Chen, Rochester Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 394 days.

(21) Appl. No.: 16/547,722

(22) Filed: Aug. 22, 2019

(65) Prior Publication Data
US 2021/0053568 A1    Feb. 25, 2021

(51) Int. Cl.
| | | |
|---|---|---|
| *B60W 30/18* | (2012.01) | |
| *B60W 10/18* | (2012.01) | |
| *B60W 10/20* | (2006.01) | |
| *H04N 5/225* | (2006.01) | |
| *G06T 7/70* | (2017.01) | |
| *H04N 5/265* | (2006.01) | |
| *G06T 7/30* | (2017.01) | |
| *B60W 10/04* | (2006.01) | |

(Continued)

(52) U.S. Cl.
CPC ...... *B60W 30/18036* (2013.01); *B60W 10/04* (2013.01); *B60W 10/18* (2013.01); *B60W 10/20* (2013.01); *G06T 7/30* (2017.01); *G06T 7/70* (2017.01); *G06V 20/56* (2022.01); *H04N 5/2253* (2013.01); *H04N 5/265* (2013.01); *B60D 1/36* (2013.01); *B60W 2300/14* (2013.01); *B60W 2420/42* (2013.01); *B60W 2710/18* (2013.01); *B60W 2710/20* (2013.01); *G06T 2207/30252* (2013.01)

(58) Field of Classification Search
CPC .. B60D 1/06; B60D 1/36; B60D 1/62; B60W 10/04; B60W 10/18; B60W 10/20; B60W 2300/14; B60W 2420/42; B60W 2710/18; B60W 2710/20; B60W 30/18036; G06K 9/00791; G06K 9/4633; G06T 2207/30252; G06T 7/30; G06T 7/70; H04N 5/2253; H04N 5/2257; H04N 5/265
See application file for complete search history.

(56) References Cited

U.S. PATENT DOCUMENTS

| | | |
|---|---|---|
| 5,187,943 A | 2/1993 | Taniguchi et al. |
| 5,951,035 A | 9/1999 | Phillips, Jr. et al. |
| 6,480,140 B1 | 11/2002 | Wall et al. |

(Continued)

*Primary Examiner* — Babar Sarwar
(74) *Attorney, Agent, or Firm* — Gregory P. Brown; Price Heneveld LLP

(57) ABSTRACT

A system for assisting in aligning a vehicle for hitching with a trailer includes a vehicle steering system, an imager mounted with and directed to a rear of the vehicle and outputting image data, and a controller. The controller receives the image data, applies a location identifier of a vehicle hitch ball to the image data, and identifies a coupler of the trailer within the image data. The controller also outputs a steering control signal to the steering system in reversing of the vehicle to align the location identifier of the vehicle hitch ball in the image data with the coupler of the trailer.

20 Claims, 11 Drawing Sheets

(51) Int. Cl.
  *G06V 20/56* (2022.01)
  *B60D 1/36* (2006.01)

(56) References Cited

U.S. PATENT DOCUMENTS

| | | | |
|---|---|---|---|
| 6,970,184 B2 | 11/2005 | Hirama et al. | |
| 9,102,271 B2* | 8/2015 | Trombley | B60R 1/003 |
| 9,499,018 B2* | 11/2016 | Gehrke | B60D 1/06 |
| 9,696,723 B2* | 7/2017 | Zeng | G05D 1/0212 |
| 2012/0312520 A1 | 12/2012 | Hoke et al. | |
| 2013/0226390 A1 | 8/2013 | Luo et al. | |
| 2014/0012465 A1* | 1/2014 | Shank | B62D 15/0285 701/36 |
| 2015/0115571 A1* | 4/2015 | Zhang | H04N 7/183 280/477 |
| 2015/0197136 A1 | 7/2015 | Chen et al. | |
| 2016/0023601 A1* | 1/2016 | Windeler | B62D 15/0275 348/118 |
| 2016/0052548 A1* | 2/2016 | Singh | B60D 1/36 701/37 |
| 2016/0185169 A1* | 6/2016 | Strand | B60D 1/36 280/479.1 |
| 2016/0288601 A1 | 10/2016 | Gehrke et al. | |
| 2016/0304122 A1* | 10/2016 | Herzog | B62D 15/0295 |
| 2016/0375831 A1 | 12/2016 | Wang et al. | |
| 2017/0158007 A1* | 6/2017 | Lavoie | B60W 10/30 |
| 2017/0282685 A1 | 10/2017 | Bader et al. | |
| 2018/0029429 A1* | 2/2018 | Janardhana | B62D 15/028 |
| 2018/0039278 A1* | 2/2018 | Huger | B60W 50/14 |
| 2018/0081370 A1* | 3/2018 | Miller | B60D 1/36 |
| 2018/0181142 A1* | 6/2018 | Baran | G01C 11/06 |
| 2018/0215382 A1* | 8/2018 | Gupta | G08G 1/166 |
| 2018/0312022 A1* | 11/2018 | Mattern | B62D 15/026 |
| 2019/0339704 A1* | 11/2019 | Yu | G06T 7/246 |
| 2019/0340787 A1* | 11/2019 | Ramirez Llanos | G06T 7/75 |
| 2020/0039517 A1* | 2/2020 | Berkemeier | B60D 1/06 |

* cited by examiner

SYSTEM FOR ALIGNING A VEHICLE HITCH LOCATION IDENTIFIER WITH A TRAILER COUPLER

FIELD OF THE INVENTION

The present invention generally relates to a vehicle hitch assistance system. In particular, the system can align the vehicle such that a phantom hitch ball image aligns with a trailer coupler when a hitch ball is not present or cannot be identified.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a system for assisting in aligning a vehicle for hitching with a trailer includes a vehicle steering system, an imager mounted with and directed to a rear of the vehicle and outputting image data, and a controller. The controller receives the image data, applies a location identifier of the vehicle hitch ball to the image data, and identifies a coupler of the trailer within the image data. The controller also outputs a steering control signal to the steering system in reversing of the vehicle to align the location identifier of the vehicle hitch ball in the image data with the coupler of the trailer.

Embodiments of the first aspect of the invention can include any one or a combination of the following features:
- the system further includes a vehicle brake system and a vehicle powertrain control system, and the controller further outputs brake and powertrain control signals to the brake system and the powertrain control system in reversing of the vehicle in aligning the location identifier of the vehicle hitch ball to the image data with the coupler of the trailer;
- applying the identifier of the vehicle hitch ball to the image data includes adding the identifier to the image data correlated with a hitch ball location relative to a vehicle ground plane captured in the image data, and aligning the location identifier of the vehicle hitch ball to the image data with the coupler of the trailer includes determining a relative position of the location identifier in the image data with the identified coupler within the image data;
- determining the relative position of the location identifier to the identified coupler within the image data is carried out using a pixel comparison process;
- the relative position of the location identifier to the identified coupler within the image data includes a distance from the location identifier to the identified coupler within the image data and an angle of the distance relative to a vehicle longitudinal axis;
- the controller further receives the image data and identifies a vehicle hitch ball in the image data, the location identifier corresponding with a location of the identified vehicle hitch ball in the image data;
- the controller further stores the location of the identified vehicle hitch ball in memory;
- the controller further receives the image data and attempts to identify a vehicle hitch ball in the image data and outputs the steering control signal to the steering system in reversing of the vehicle to align the location identifier of the vehicle hitch ball to the image data with the coupler of the trailer including when no vehicle hitch ball is identified in the image data;
- the controller further, upon no hitch ball being identified in the image data, retrieves a stored hitch ball location from memory and applies the location identifier of the vehicle hitch ball to the image data to correspond with the stored hitch ball location;
- the stored hitch ball location corresponds with a location of an identified hitch ball from a previous operation of the system; and
- the stored hitch ball location corresponds with a system default location.

According to another aspect of the present disclosure, a vehicle includes a steering system operably connected with steered wheels of the vehicle, an imager mounted with and directed to a rear of the vehicle and outputting image data, and a controller. The controller receives the image data, applies a location identifier of the vehicle hitch ball to the image data, and identifies a coupler of the trailer within the image data. The controller also outputs a steering control signal to the steering system in reversing of the vehicle to align the location identifier of the vehicle hitch ball to the image data with the coupler of the trailer.

According to another aspect of the present disclosure, a method for assisting in aligning a vehicle for hitching with a trailer includes receiving image data from an imager mounted with and directed to a rear of the vehicle and outputting image data and applying a location identifier of a vehicle hitch ball to the image data. The method also includes identifying a coupler of the trailer within the image data and outputting a steering control signal to a vehicle steering system in reversing of the vehicle to align the location identifier of the vehicle hitch ball to the image data with the coupler of the trailer.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
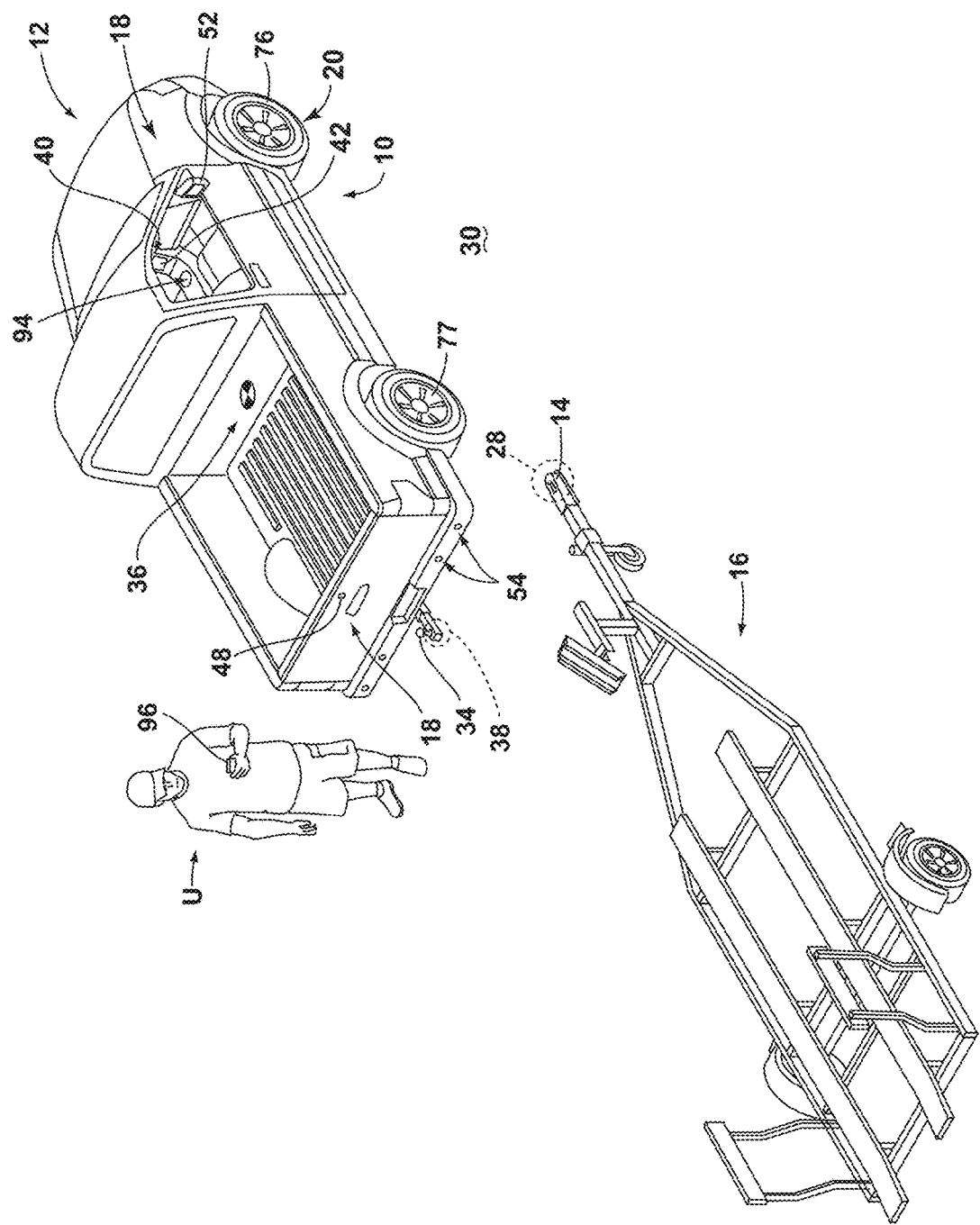
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular system 10 includes With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

Figure 2:
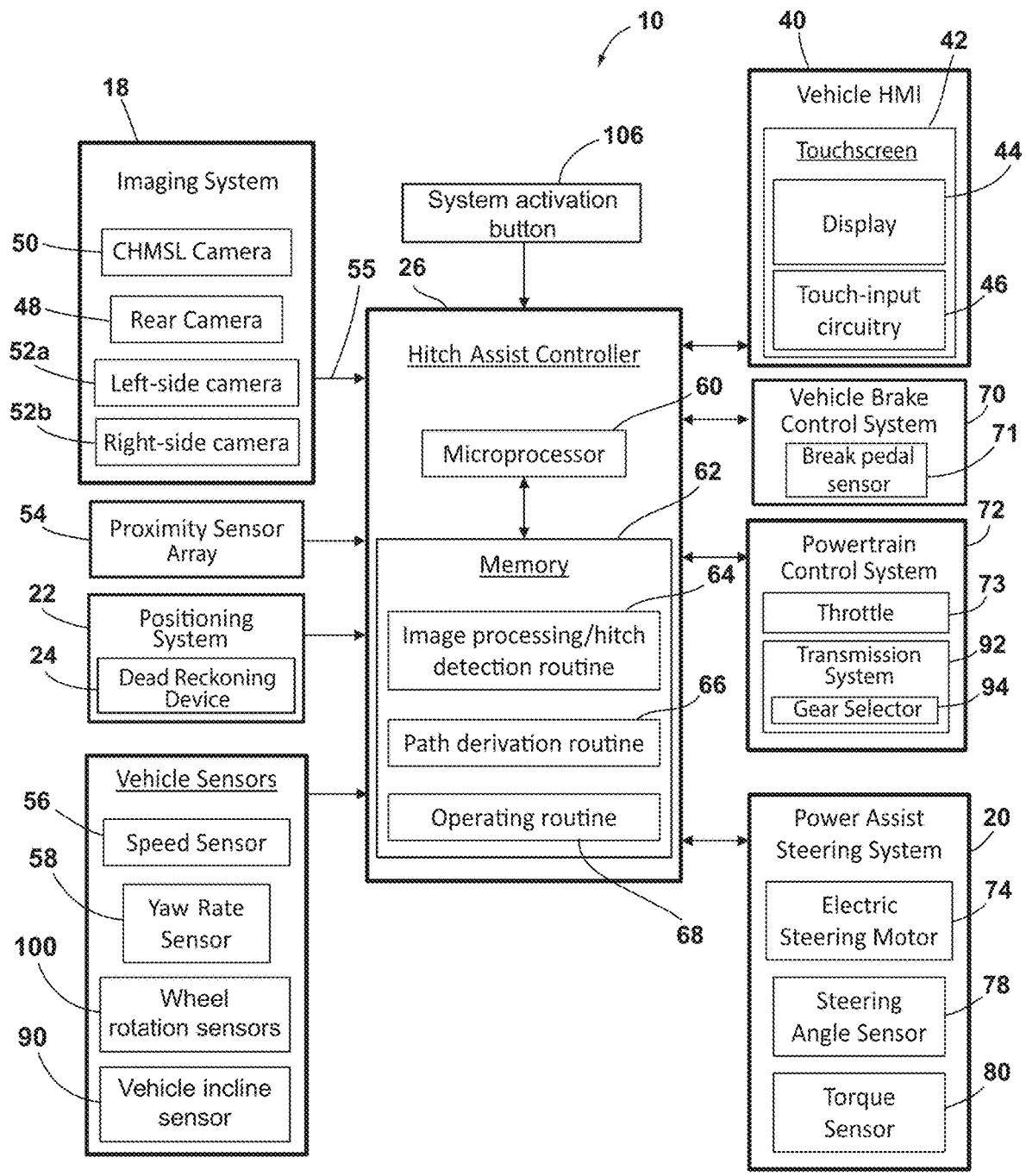
FIG. 2 is a diagram of a system according to an aspect of the disclosure for assisting in aligning the vehicle with a trailer in a position for hitching the trailer to the vehicle.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command 69, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
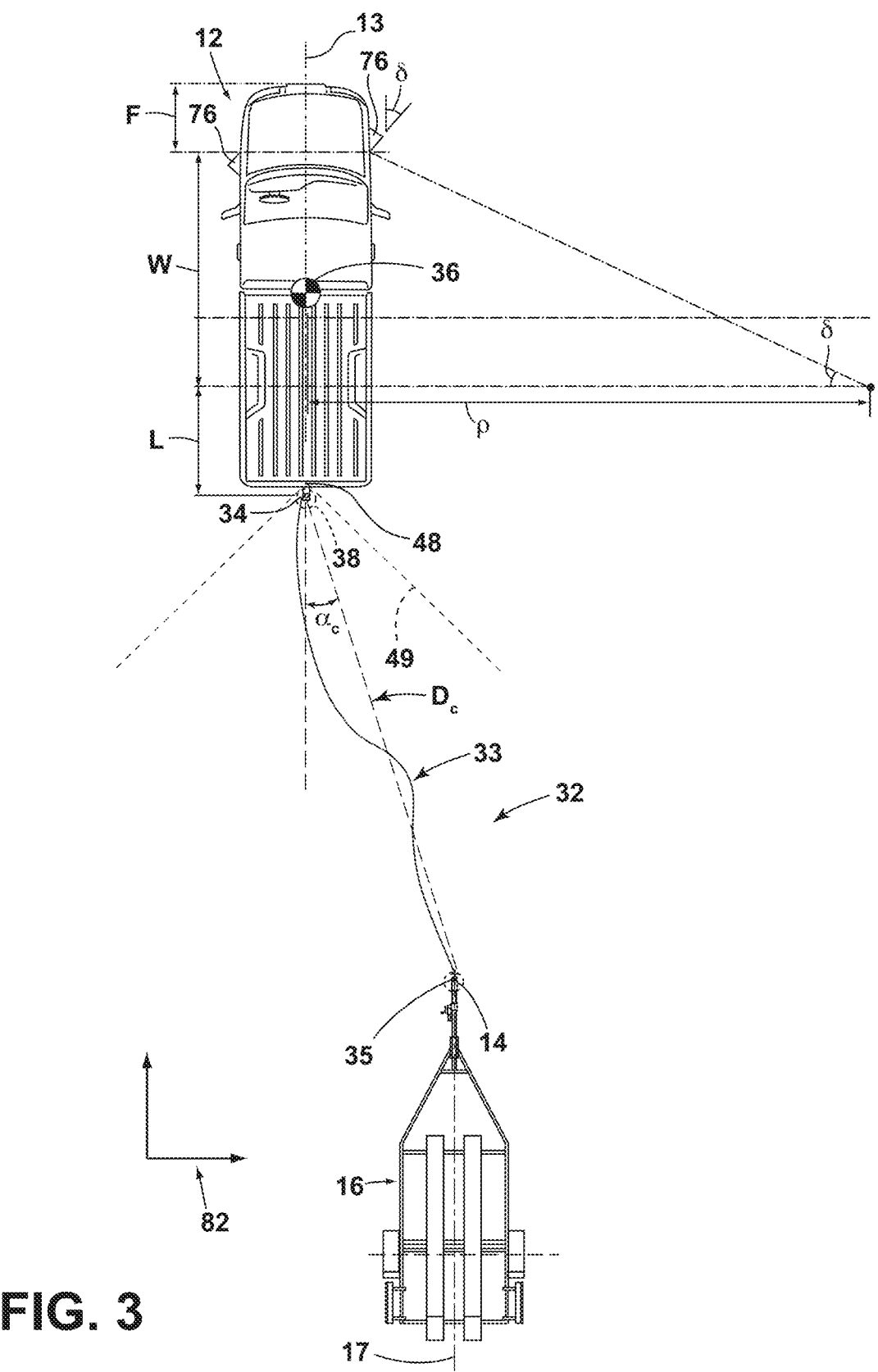
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means.

In some embodiments, individual wheel speeds can also be used to determine a vehicle yaw rate $\dot{\gamma}$, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system 18 for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CHMSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein my generally used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis 13 of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\eta$ for vehicle 12 according to the equation:

$$\rho = \frac{W}{\tan\delta}, \qquad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius pmm is determined as:

$$\rho_{min} = \frac{W}{\tan\delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\eta_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction by determining the movement of coupler 14 in the vertical direction Δy that will be needed to receive hitch ball 34 within coupler 14. Such functionality is discussed further in co-pending, commonly-assigned U.S. patent application Ser. No. 14/736,391 and Ser. No. 16/038,462, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 4:
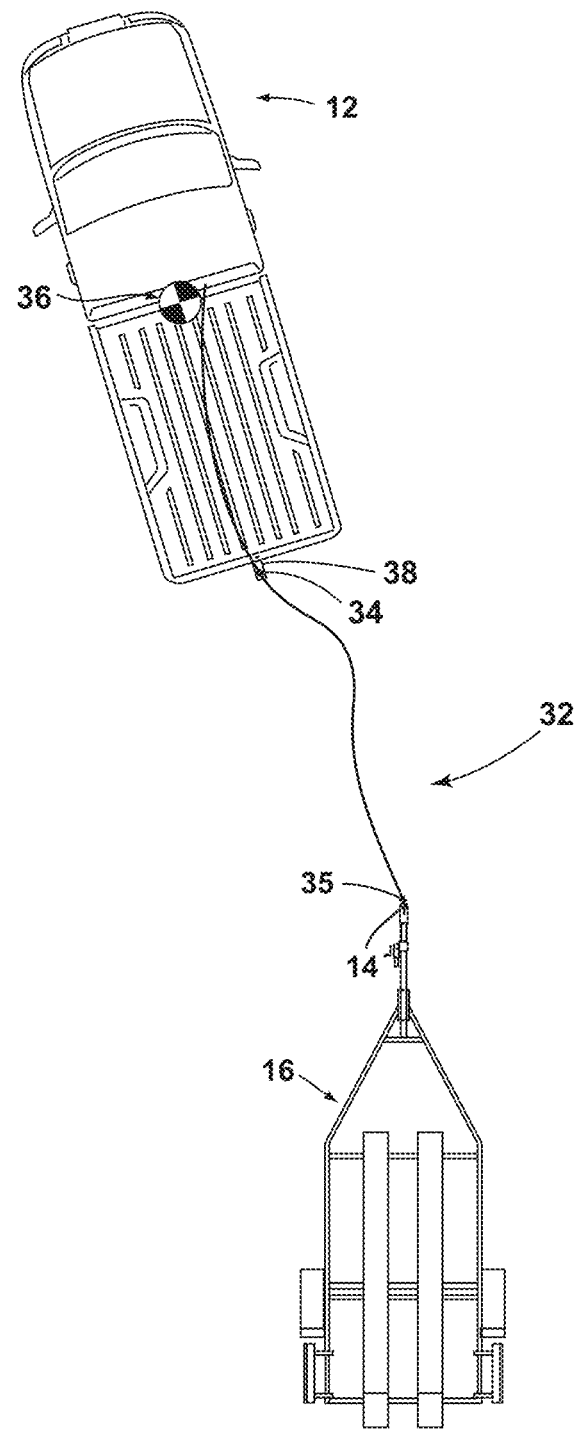
FIG. 4 is an overhead schematic view of the vehicle during a subsequent step of the alignment sequence with the trailer.
Figure 5:
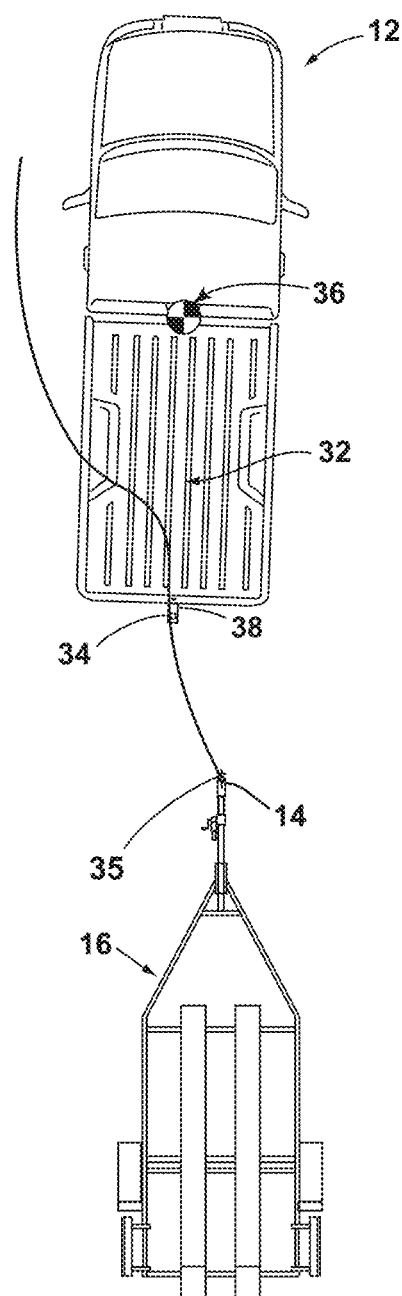
FIG. 5 is an overhead schematic view of the vehicle during a subsequent step of the alignment sequence with the trailer.
Figure 6:
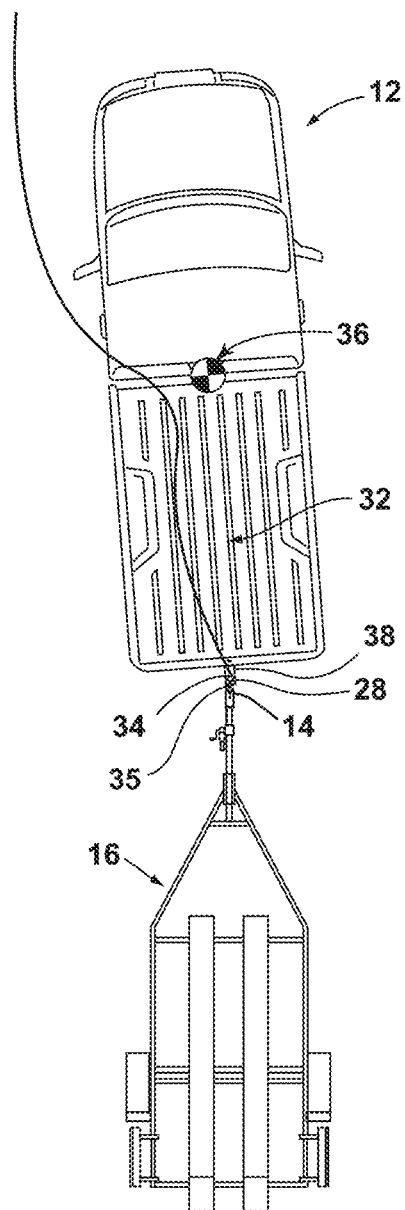
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of rear camera 48, with continued movement of vehicle 12 along path 32. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16, as shown in FIGS. 4 and 5. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38d thereof relative to the tracked position 28 of coupler 14, as discussed above and shown in FIG. 6.

The "longitudinal control" in an assisted hitching maneuver is the portion of vehicle 12 movement along path 32 controlled by the vehicle powertrain control system 72 and the vehicle brake system 70 with the "lateral control" being the portion controlled by the power assist steering system 20. It is to be understood that the lateral control requires movement of the vehicle such that the two control schemes operate together to move vehicle 12 along the path 32. In this respect, the longitudinal alignment of the path 32 with the coupler 14 is dictated by the longitudinal control (i.e., by the steering system 20) and the final stopping point of vehicle 12 along path 32 is dictated by the longitudinal control. In this respect, the final stopping point of the vehicle 12 along path 32 determines the alignment in the direction of travel between hitch ball 34 and coupler 14. In this manner, system 10 may be able to move vehicle 12 to the final target position in a precise manner, for example, such that trailer 16 does not have to be manually repositioned by the user, but can simply be lowered onto hitch ball 34. In one implementation of system 10, the accuracy in final longitudinal alignment of hitch ball 34 with coupler 14 can be to within 1 cm of a completely aligned position (center-to-center).

As can be appreciated by the above, the automated hitching feature carried out by controller 26 executing operating routine 68 automatically maneuvers vehicle 14 to align the vehicle hitch ball 34 with the coupler 14 of the subject trailer 16. As an initial step, system 10 identifies and the targeted trailer coupler 14 using image processing routine 64 to derive the initial path using path routine 66. In this respect, system 10 may also use the image processing routine 64 to determine the position of hitch ball 34 so that the path derivation routine 66 can derive path 32 based on the relative positions of hitch ball 34 and coupler 14. During execution of operating routine 68, system 10 provides automated longitudinal and lateral vehicle control by control of the steering system 20, brake system 70, and powertrain control system 72 to maneuver the vehicle 12 toward the desired aligned position. During such control, system 10 continues to track the location 28 of coupler 14 to update path 32 as needed by continuing to run the image processing routine 64 and/or path derivation routine 66. In a similar manner, system 10 can continue to track the location 38 of hitch ball 34, as the final desired alignment is based on the location of hitch ball 34 (i.e. to align with coupler 14). In this respect, the final alignment may be improved by continuing to control vehicle 12 based on the relative positions of hitch ball 34 and coupler 14 within the image data.

In implementing the above-described alignment process, precise alignment may be negatively impacted if system 10 is unable to detect/locate the hitch ball 34 in the image data 55 or becomes unable to track hitch ball 34 in the image data 55 once operating routine 68 is initiated. The inability to continually locate or track hitch ball 34 in the image data 55 may arise due to limitations of the image processing routine 64 or capability of controller 26 and/or deficiencies in the image data 55 itself, including by ambient conditions and/or the resolution of, for example, rear camera 48. In one non-limiting example, the hitch ball 34 and/or the feature mounting hitch ball 34 to vehicle 12 may be dark in color such that, when viewed against a ground surface S background that is also dark (or conversely, light upon light), hitch ball 34 may not be identifiable or by image processing routine 64 distinguishing it from the background image. In another example, the ambient lighting may be poor or may be interrupted by intermittent shadows (e.g. from the surrounding environment), such that the hitch may be dimly lit or may become covered by a shadow and, accordingly, unidentifiable or lost during tracking by image processing routine 64. Additionally, various factors may result in several of such factors being combined, such that system 10 is unable to distinguish the hitch ball 34 in the image 55, including toward or during the final alignment of hitch ball 34 with coupler 14 (e.g. when dc is less than 0.2 m or less than 0.1 m). Further, in various arrangements or conditions, the coupler 14 may obscure hitch ball 34 during final alignment.

In an additional example, some drivers may wish to run the above alignment process using system 10 without the hitch ball 34 installed with vehicle 12 (such hitch balls 34 being generally removable, replaceable, and interchangeable with other hitch balls 34). In one aspect, such drivers may desire to align the vehicle 14 with the trailer 16 without the hitch 34 installed, desiring to install the hitch 34 at same time that the trailer 16 is connected with the vehicle 14 (i.e., by positioning coupler 14 over hitch 34) so as to only have to exit the vehicle 14 once, instead of twice. However, an implementation of system 10 that requires identification of the hitch ball 34 prior to initiation of operating routine 68 will not allow such operation.

The presently-described system 10 can, accordingly, be adapted to perform the complete automated hitching operation without the presence, other identification, or continuous tracking of an installed hitch ball 34. In general, the system 10 accomplishes this by being configured to retrieve a last known hitch position 38 from memory 62. The retrieved position 38 (e.g. on the 2D ground plane) is then converted by controller 26, including by functionality programmed into the image processing routine 64 or operating routine 68, into a location identifier 84 on the rear camera 48 image 55, thus creating a "phantom hitch", which may be implemented by a pixel-based representation, both in position and size, corresponding with the location identifier 84. Operating routine 68 and/or path derivation routine 66 can then estimate the desired alignment of the coupler 14 of the subject trailer 16 using a pixel comparison process between the trailer coupler 14 identified in the image data 55 and the location identifier 84 in substitution for an identified or tracked hitch ball 34. In this manner, the system 10 can also use the location identifier 84 when a present and initially-detected hitch ball 34 becomes obscured by the trailer coupler 16 or unidentifiable due to other ambient conditions. System 10 can, accordingly, bring the vehicle to a stop using the powertrain control system 72 and brake system 70 when the coupler 14 overlaps the location identifier 84.

Figure 7:
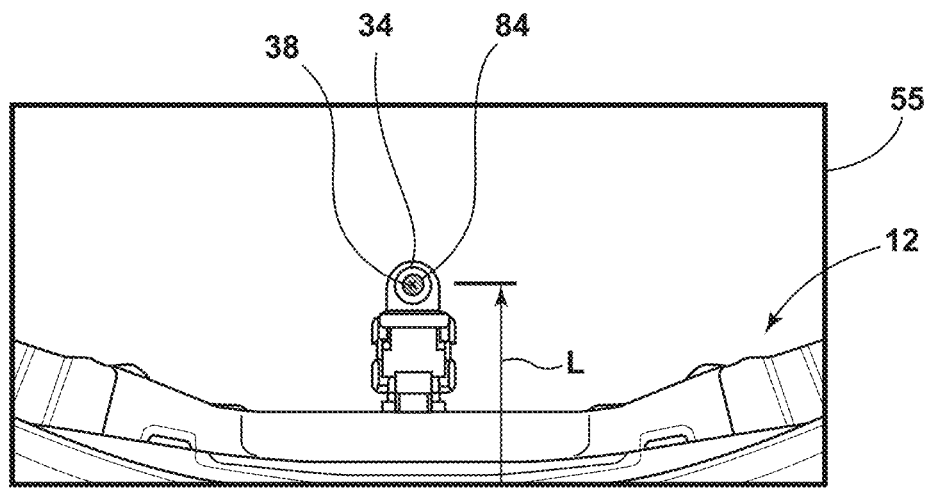
FIG. 7 is a representation of an image included in data illustrating the identification of a vehicle hitch ball in the image data.

With reference to FIGS. 7-13, the process for utilizing the location identifier 84 in an automated reversing routine for alignment of vehicle 12 for hitching with a trailer 16 is described in greater detail. As generally discussed above, the automated hitching feature, upon being activated by the user, begins with the system 10 using the image processing routine 64 on the image data 55 received from, for example, rear camera 48 to detect the position 38 of the hitch ball 34. In one example, this can be carried out using contour identification and Hough transform processes in conjunction with down-selection of a search window applied to image data 55 to positively identify the presence of the hitch ball 34 and its position 38. The system 10 is configure to take different actions depending on whether or not the hitch 34 is initially detected. To determine the desired action, system 10 can use a parameter flag to indicate whether or not the hitch 34 is detected. As shown in FIG. 7, if a hitch 34 is initially detected, the parameter flag is set to true; otherwise, the flag is set to false. If a hitch is detected, the hitch position (e.g., in an X, Y, Z coordinate system 82 associated with the space surrounding vehicle 12) is saved to memory 62 for future use, as discussed below. During a single activation cycle and execution of an automated hitching routine, this stored date from memory 62 may not be needed, but, as described in greater detail below, the stored data may be used in future feature activations when no hitch 34 is installed or is otherwise not detected.

Figure 8:
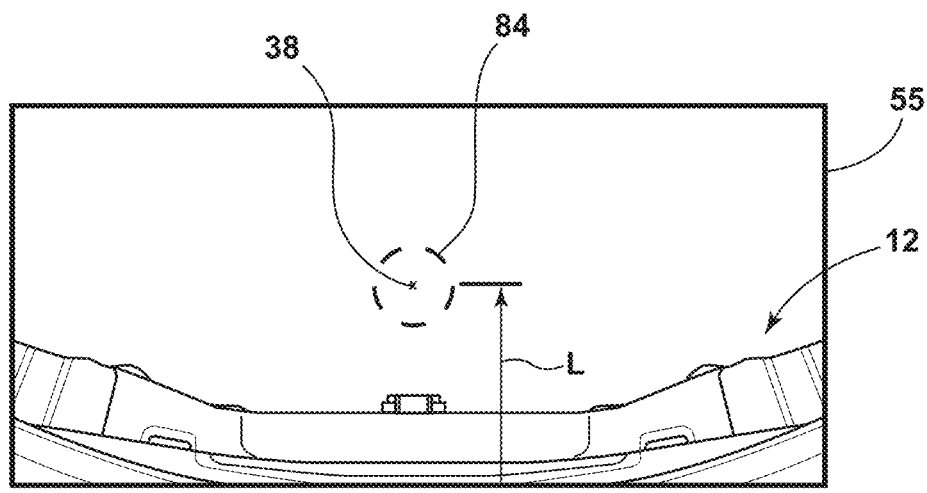
FIG. 8 is a representation of image data including a location identifier for a hitch ball.

As discussed above, system 10 uses a pixel-comparison technique to guide and assess the alignment of the hitch ball 34 relative to the coupler 14 (discussed in greater detail below). The pixel-comparison is facilitated through the initial application of the above-mentioned location identifier 84 to the image data 55 for use in the pixel-comparison in substitution for the actual image of hitch ball 34, should the hitch ball 34 be absent or undetectable in the image data 55. In this manner, the location identifier 84 is superimposed on the image data 55 continuously in a frame-by-frame manner to define the pixel space that will represent the hitch ball 34 during any portions of the maneuver when system 10 determines the need to do so. To achieve application of the location identifier 84 to the image data 55, as shown in FIG. 8, the 2-D position of the hitch ball 34 on the ground plane S is converted to a position 38 in the image data 55. This conversion may be accomplished using a lookup table formulated based on the particular geometry of the vehicle 14 and relevant components of system 10 (including, for example, the position of camera 48, the viewing angle of the resulting image data 55, and the resolution of camera 48). By way of example a hitch ball 34 with a longer drawbar (which would be located farther from the vehicle 14 along the longitudinal axis thereof) is represented as "higher up" in the image data 55 (i.e. upward with respect to the depiction of image data 55 in the view of FIGS. 7 and 8, with the converse being similarly observed. In an alternative implementation, the particular locations of the pixels identified as defining the actual hitch ball 34, when identified by system 10, may be saved to memory 62 and directly retrieved, when needed, to obviate the need for conversion between the vehicle coordinate system 82 and the image data 55. The system 10 then uses further image processing 64 of the rear camera 48 image data 55 to determine the position 28 of the coupler 14 of the target trailer 16, including a determination of the relative distance $d_c$ between the hitch ball 34 location 38, whether indicated by the actual hitch ball 34 or by the location indicator 84, and the coupler 14. In one example, image processing routine 64 uses a Hough transform or similar technique on the tracked position of the trailer 16 to identify the associated coupler 14. In one implementation, system 10 can keep the location indicator 84 and its corresponding representation in image data 55 persistent during operation, with the identifier 84 being updated, refined, or otherwise repositioned, as dictated by the continued image processing 64 with the most recent position 38 of the identifier 84 being used (and updated in memory 62) upon any tracking loss of the hitch ball 34.

Figure 9:
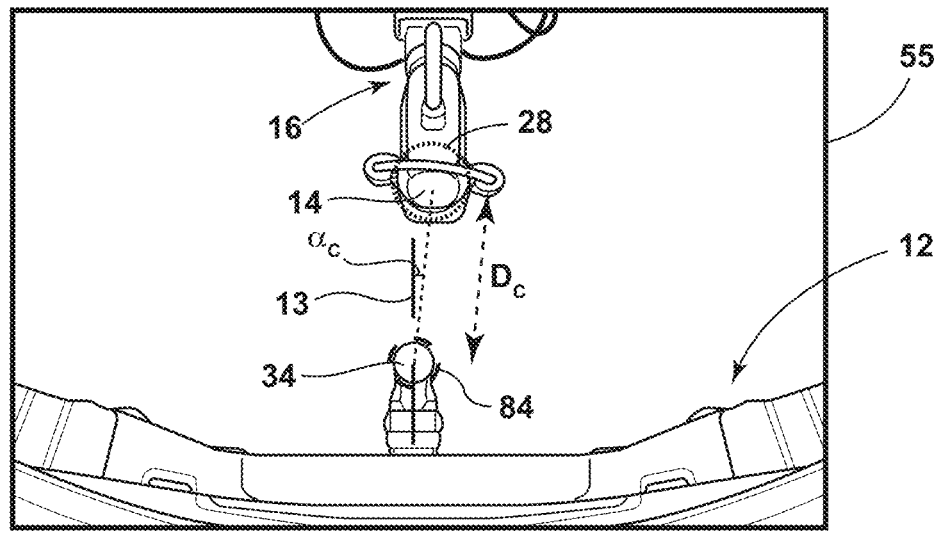
FIG. 9 is a representation of image date including a location identifier for a hitch ball in a tracked position relative to a trailer coupler identified in the image data.

The system 10 continues to automatically control the vehicle 14 heading 33 (via steering system 20) and speed (via powertrain control system 72 and brake system 70, as discussed above with respect to FIGS. 4-6) as vehicle 14 approaches the trailer 16. During such control, system 10 continues to use the above pixel comparison between the identified coupler 14 and the hitch ball 34 or location identifier 84, as applicable based on available information or system 10 configuration, to estimate the distance $d_c$ remaining until alignment. As shown in FIG. 9, the pixel comparison may also be used to derive an angle $\alpha_c$ between the vehicle longitudinal axis 13 and the location 84 of coupler 14 about the hitch ball 34 location 38 for use in controlling steering system 20 according to operating routine 68. In either implementation, system 10 determines the relative locations by determining the number of pixels between the operative features in the image data 55 and translating the derived pixel count from the image data 55 to an actual distance along the ground plane. In one implementation, the number of pixels is measured between the center-point location 28 of the detected coupler 14 the center-point location 38 of the detected hitch 34 or location identifier 84. The pixel count can then converted to the actual distance $d_c$ by employing the same lookup table discussed above from step 232, utilized in the reverse direction.

Figure 10:
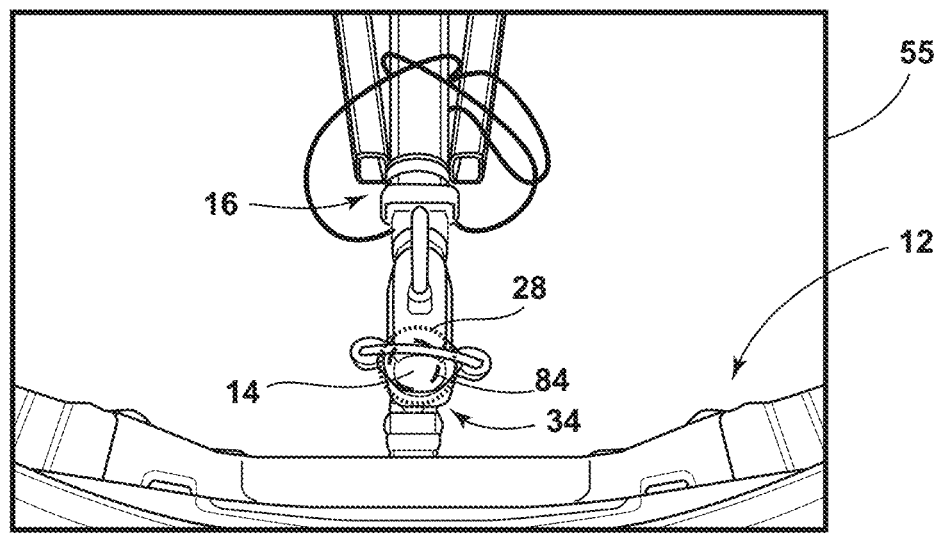
FIG. 10 is a representation of image data including a hitch ball in an overlapped position with a trailer coupler identified in the image data and a location identifier for the hitch ball.

In one aspect of operation, when the vehicle 14 is near the final desired alignment position with respect to trailer 16, the hitch ball 34, although initially visible, can become obscured underneath the trailer coupler 14 from the perspective of the rear camera 48, as shown in FIG. 10. In such an instance, the location identifier 84 can be used to track the location 38 of hitch ball 34 without requiring the presence of hitch ball 34 in the image data 55 and operating routine 68 can continue running with the location identifier 84 used to estimate the distance dc remaining until alignment, at which point, system 10 brings vehicle 12 to a stop and ends operating routine 68.

Figure 11:
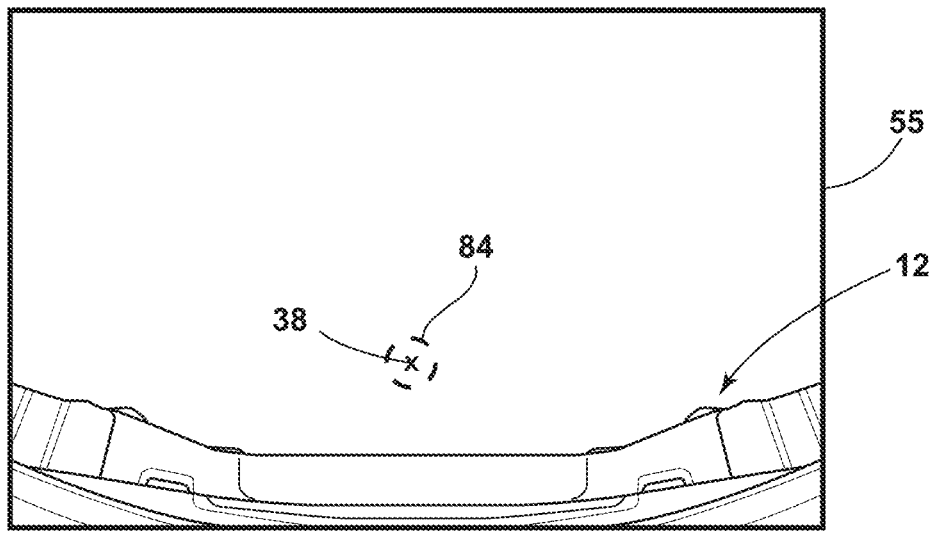
FIG. 11 is a representation of image data including a location identifier for a hitch ball in the absence of an actual hitch ball.
Figure 12:
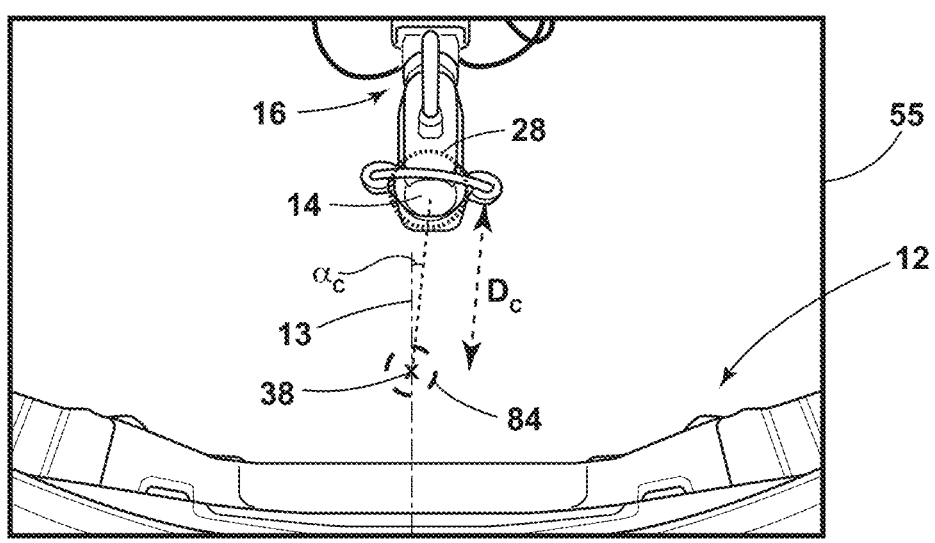
FIG. 12 is a representation of image date including a location identifier for a hitch ball in a tracked position relative to a trailer coupler identified in the image data.
Figure 13:
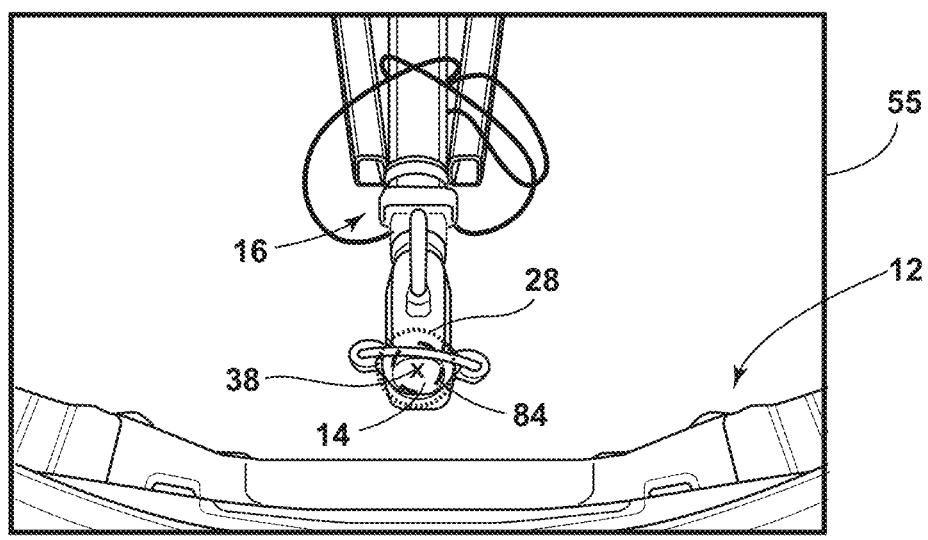
FIG. 13 is a representation of image data including the location identifier in an aligned position with the trailer coupler.

In another aspect, shown in FIGS. 11-13, system 10 may operate when no hitch ball 34 is assembled with vehicle 12 or is otherwise not present (or not detectable) in the available image data 55, as illustrated in FIG. 11. In this manner, system 10, upon initiation, can retrieve from memory 62 the most recent stored hitch ball position 38 and can apply a corresponding location identifier 84 to the image data 55, as discussed above. As shown in FIG. 12, system 10 can use the above-described pixel-comparison scheme in the same manner as discussed above, with the location identifier 84 being used, if needed, through the entire execution of the hitching process, for the relevant comparison with the position 28 of the coupler 14. As shown in FIG. 13, when the pixels of the location indicator 84 are fully aligned to the pixels of the trailer coupler 14, the system 10 stops the vehicle 12 with the hitch ball 34 being aligned with the coupler 14, including when assembled after the reversing operation (in the event that the same or hitch ball 34 as last detected or at least a hitch ball 34 with a similar drawbar length to the last assembled hitch ball 34 is used). System 10 can function similarly if a hitch ball 34 is installed but is not detected by the system 10 at all during operation (e.g., because of poor lighting).

The presently-described system 10 implementing the above described pixel-tracking (or comparable) process with a hitch ball 34 location 38 identified, allows an automated hitching operation to proceed under conditions when a hitch 34 is not clearly visible in the rear camera 48 image data 55, and therefore, is not detected by the system 10. Thus, system 10 is more robust to low light conditions, light reflective conditions, and different combinations of hitch ball 34 and mount types, as well as and ground surface types or appearances. Additionally, as described above, system 10 is able to operate without a hitch ball 34 installed on vehicle 12. In various implementations and use cases, such as those described above, if no hitch ball 34 position 38 data 55 is not available in memory 62, (such as on the first ever usage of the feature), the system 10 can be pre-loaded with a nominal constant value set as a system default location for such position 38 to represent a "typical" hitch ball 34 and assembly. In this way, a value for the position 38 can always be available in memory 62 for the system 10 to retrieve.

Figure 14:
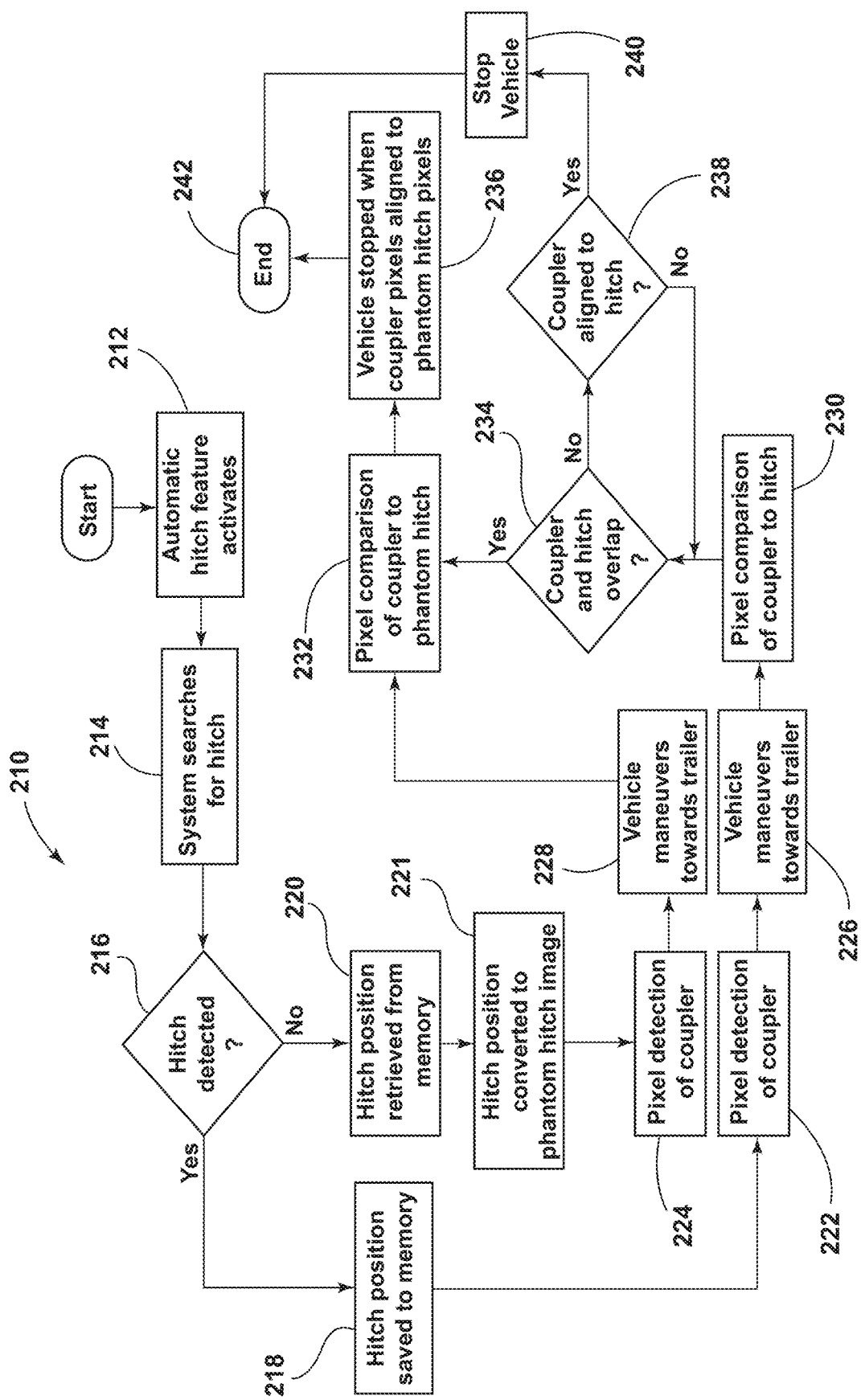
FIG. 14 is a flowchart depicting various steps included in a method for using a hitch ball location identifier in an automated hitching process.

In an aspect of the disclosure, the system 10 operates within the general context of a method for assisting in aligning the vehicle 12 for hitching with a subject trailer 16. With reference to the flowchart of FIG. 14, the method 210 can include, after activation 212, the initial step 214 of receiving image data 55 from an imager (e.g. the camera system 18 described above or the rear camera 48 directly), the imager being mounted with and directed to the rear of the vehicle 12, as shown in FIG. 1, and outputting image data 55. The system 10 can attempt to identify a hitch ball 34 in the image data 55. If a hitch ball 34 is detected (in step 216), the hitch ball position 38 is stored in memory 62, as discussed above (step 218). If no hitch ball is detected, a stored hitch ball position 38 is retrieved from memory 62 (step 220) and is converted to a corresponding location identifier 84 within the image data 55 to apply the location identifier 84 of the vehicle hitch ball 34 to the image data 55 (step 221). The system 10 then proceeds with a reversing maneuver using operating routine 68, as discussed further above, including identifying a coupler 14 (step 222 or step 224) of the subject trailer 16 within the image data 55 and outputting steering control signal to the vehicle steering system 20 in reversing of the vehicle and/or controlling the vehicle brake system 70 and the vehicle powertrain control system 72 to maneuver the vehicle toward the trailer 16 (step 226 or step 228). The hitching operation further includes running the above-described pixel count process to determine the position 28 of the coupler 14 relative to the hitch ball 34 (step 230), when the hitch ball 34 is identified, or relative to the location identifier 84 (step 232), when the hitch ball 34 is not identified, based on the image data 55. The operative process continues using the identified hitch ball until such a time as the hitch ball 34 is overlapped in the image data 55 by the coupler 14 (step 234). When this happens, the last known position of the hitch ball 34 is retrieved from memory 62 and is used to apply the location identifier 84 to the position 38. Accordingly, in the final stages, the process operates to continue maneuvering vehicle 12 to align the location identifier 34 of the vehicle hitch ball 34 in the image data 55 with the coupler 14 of the trailer 16. When such a position is reached, system 10 stops the vehicle 12 (step) 236. Further, in an instance, where system 10 can determine that the coupler 14 is aligned with the hitch ball 34 (step 238) without an overlap being determined (step 234), system 10 can similarly stop vehicle 12 (step 240). In either case, when vehicle 12 is stopped, system 10 ends the process (step 238).

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer, comprising:
   a vehicle steering system;
   an imager mounted with and directed to a rear of the vehicle and outputting image data; and
   a controller:
   receiving the image data, superimposing on the image data a location identifier corresponding with a position of a vehicle hitch ball with respect to the rear of the vehicle, and identifying a coupler of the trailer within the image data; and
   outputting a steering control signal to the vehicle steering system in reversing of the vehicle, without continuously tracking the position of the vehicle hitch ball, to align the location identifier in the image data with the coupler of the trailer in the image data.

2. The system of claim 1, further including:
   a vehicle brake system; and
   a vehicle powertrain control system;
   wherein the controller further outputs brake and powertrain control signals to the brake system and the powertrain control system in reversing of the vehicle in aligning the location identifier to the image data with the coupler of the trailer.

3. The system of claim 1, wherein:
   superimposing the location identifier in the image data includes adding the location identifier to the image data in a manner correlated with the position of the vehicle hitch ball relative to a vehicle ground plane captured in the image data; and
   aligning the location identifier with the coupler of the trailer includes determining a relative position of the location identifier in the image data with the identified coupler within the image data.

4. The system of claim 3, wherein determining the relative position of the location identifier to the identified coupler within the image data is carried out using a pixel comparison process.

5. The system of claim 3, wherein the relative position of the location identifier to the identified coupler within the image data includes a distance from the location identifier to the identified coupler within the image data and an angle of the distance relative to a vehicle longitudinal axis.

6. The system of claim 1, wherein the controller further receives the image data and identifies the vehicle hitch ball in the image data, the location identifier being superimposed on the image data to correspond with a location of the identified vehicle hitch ball in the image data.

7. The system of claim 6, wherein the controller further stores the location of the identified vehicle hitch ball in memory.

8. The system of claim 1, wherein the controller further:
   receives the image data and attempts to identify the vehicle hitch ball in the image data; and
   outputs the steering control signal to the vehicle steering system in reversing of the vehicle to align the location identifier to the image data with the coupler of the trailer in the image data, including when no vehicle hitch ball is identified in the image data.

9. The system of claim 8, wherein the controller further, upon no hitch ball being identified in the image data, retrieves a stored hitch ball location from memory and superimposes the location identifier on the image data to correspond with the stored hitch ball location.

10. The system of claim 9, wherein the stored hitch ball location corresponds with an identified location of the vehicle hitch ball from a previous operation of the system.

11. The system of claim 9, wherein the stored hitch ball location corresponds with a system default location.

12. A vehicle, comprising:
- a steering system operably connected with steered wheels of the vehicle;
- an imager mounted with and directed to a rear of the vehicle and outputting image data; and
- a controller:
  - receiving the image data, attempting to identify a vehicle hitch ball in the image data, applying a location identifier to the image data in response to no hitch ball being identified in the image data, and identifying a coupler of a trailer within the image data; and
  - outputting a steering control signal to the steering system in reversing of the vehicle to align the location identifier in the image data with the coupler of the trailer, without tracking a position of the vehicle hitch ball in the image data.

13. The vehicle of claim 12, wherein:
- applying the location identifier to the image data includes adding the location identifier to the image data correlated with a hitch ball location relative to a vehicle ground plane captured in the image data; and
- aligning the location identifier of the vehicle hitch ball to the image data with the coupler of the trailer includes determining a relative position of the location identifier to the identified coupler within the image data.

14. The vehicle of claim 13, wherein:
- the relative position of the location identifier to the identified coupler within the image data includes a distance from the location identifier to the identified coupler within the image data and an angle of the distance relative to a vehicle longitudinal axis; and
- determining the relative position of the location identifier with the identified coupler within the image data is carried out using a pixel comparison process.

15. The vehicle of claim 12, wherein the controller further:
- receives the image data and identifies the vehicle hitch ball in the image data, the location identifier corresponding with a location of the identified vehicle hitch ball in the image data; and
- stores the location of the identified vehicle hitch ball in memory.

16. The vehicle of claim 12, wherein the controller further, upon no hitch ball being identified in the image data, retrieves a stored hitch ball location from memory and applies the location identifier of the vehicle hitch ball to the image data to correspond with the stored hitch ball location.

17. The vehicle of claim 16, wherein the stored hitch ball location corresponds with a location of an identified hitch ball from a previous operation of the steering system.

18. The vehicle of claim 16, wherein the stored hitch ball location correspond with a system default location.

19. The system of claim 12, wherein the controller applies the location identifier to the image data by superimposing the location identifier on the image data continuously and in a frame-by-frame manner to define a pixel space in the image to represent the vehicle hitch ball.

20. A method for assisting in aligning a vehicle for hitching with a trailer, comprising:
- receiving image data from an imager mounted with and directed to a rear of the vehicle and outputting image data;
- attempting to identify a vehicle hitch ball in the image data;
- in response to failing to identify the vehicle hitch ball in the image data, applying a location identifier to the image data;
- identifying a coupler of the trailer within the image data; and
- outputting a steering control signal to a vehicle steering system in reversing of the vehicle to align the location identifier in the image data with the coupler of the trailer in the image data.

* * * * *